United States Patent
Zhang et al.

(10) Patent No.: US 12,381,822 B2
(45) Date of Patent: Aug. 5, 2025

(54) DATA FLOW TABLE, METHOD AND DEVICE FOR PROCESSING DATA FLOW TABLE, AND STORAGE MEDIUM

(71) Applicant: PURPLE MOUNTAIN LABORATORIES, Jiangsu (CN)

(72) Inventors: Jin Zhang, Nanjing (CN); Dun Yang, Nanjing (CN); Xuewu Pei, Nanjing (CN); Yiming Jiang, Nanjing (CN); Youjun Bu, Nanjing (CN); Hailong Ma, Nanjing (CN); Peng Yi, Nanjing (CN)

(73) Assignee: PURPLE MOUNTAIN LABORATORIES, Jiangsu (CN)

( * ) Notice: Subject to any disclaimer, the term of this patent is extended or adjusted under 35 U.S.C. 154(b) by 288 days.

(21) Appl. No.: 17/996,378

(22) PCT Filed: Oct. 28, 2020

(86) PCT No.: PCT/CN2020/124355
§ 371 (c)(1),
(2) Date: Oct. 17, 2022

(87) PCT Pub. No.: WO2021/208403
PCT Pub. Date: Oct. 21, 2021

(65) Prior Publication Data
US 2023/0231808 A1    Jul. 20, 2023

(30) Foreign Application Priority Data
Apr. 17, 2020 (CN) .................. 202010305885.1

(51) Int. Cl.
*H04L 45/7453* (2022.01)
*H04L 45/00* (2022.01)
*H04L 45/74* (2022.01)

(52) U.S. Cl.
CPC .......... *H04L 45/7453* (2013.01); *H04L 45/54* (2013.01); *H04L 45/742* (2013.01)

(58) Field of Classification Search
CPC .... H04L 45/54; H04L 45/742; H04L 45/7453
See application file for complete search history.

(56) References Cited

U.S. PATENT DOCUMENTS

| 8,000,244 B1 | 8/2011 | Canion et al. |
| 2004/0230696 A1* | 11/2004 | Barach .................. H04L 45/742 709/238 |

(Continued)

FOREIGN PATENT DOCUMENTS

| CN | 101540723 A | 9/2009 |
| CN | 102200906 A | 9/2011 |

(Continued)

OTHER PUBLICATIONS

International Search Report dated Jan. 27, 2021 issued in counterpart Parent Application No. PCT/CN2020/124355, w/English Translation (4 pages).

(Continued)

*Primary Examiner* — Emmanuel L Moise
*Assistant Examiner* — Xiang Yu
(74) *Attorney, Agent, or Firm* — Polsinelli PC; Simon Booth (57) ABSTRACT

Disclosed are a data flow table for high-speed large-scale concurrent data flows, method and apparatus for processing the data flow table, and a storage medium. The method includes: acquiring, according to a data flow identifier of a data flow to be inserted, addresses of candidate buckets in a fingerprint table and a data flow fingerprint; detecting whether there is an idle unit in the candidate buckets in the fingerprint table, if there is an idle unit, selecting the candidate bucket having the idle unit as target bucket; and (Continued)

sequentially searching for the idle unit from bottom unit to top unit of the target bucket, and when the idle unit is found in the target bucket, writing data flow fingerprint of said data flow into the found idle unit, and writing data flow record of said data flow into a recording bucket corresponding to the candidate bucket.

20 Claims, 4 Drawing Sheets

(56) References Cited

U.S. PATENT DOCUMENTS

| | | | | |
|---|---|---|---|---|
| 2012/0143877 | A1* | 6/2012 | Kumar | G06F 16/9014 |
| | | | | 707/747 |
| 2013/0003555 | A1 | 1/2013 | Moran et al. | |
| 2017/0163575 | A1* | 6/2017 | Wang | H04L 49/9094 |
| 2018/0260246 | A1 | 9/2018 | Boehm et al. | |
| 2019/0182160 | A1* | 6/2019 | Bengough | H04L 45/7453 |

FOREIGN PATENT DOCUMENTS

| | | |
|---|---|---|
| CN | 102833134 A | 12/2012 |
| CN | 104753726 A | 7/2015 |
| CN | 108337172 A | 7/2018 |
| CN | 109358987 A | 2/2019 |
| CN | 110019250 A | 7/2019 |
| CN | 110768856 A | 2/2020 |
| CN | 110808910 A | 2/2020 |
| CN | 111541617 A | 8/2020 |

OTHER PUBLICATIONS

PCT/ISA/220 dated Jan. 27, 2021 issued in counterpart Parent Application No. PCT/CN2020/124355 (1 page).

Written Opinion dated Jan. 27, 2021 issued in counterpart Parent Application No. PCT/CN2020/124355, w/English Translation (6 pages).

Chinese Office Action dated Feb. 3, 2021 issued in counterpart Patent Application No. 202010305885.1 (6 pages).

Notification to Grant Patent Right for Invention dated Aug. 3, 2021 issued in counterpart Patent Application No. 202010305885.1 (4 pages).

Moise et al., "Large-Scale Distributed Storage for Highly Concurrent MapReduce Applications" (4 pages).

Qi et al., "Real-time Processing for High speed Data Stream over Large Scale Data", Chinese Journal of Computers, vol. 35, No. 3, Mar. 2012, w/English Abstract (15 pages).

* cited by examiner

DATA FLOW TABLE, METHOD AND DEVICE FOR PROCESSING DATA FLOW TABLE, AND STORAGE MEDIUM

CROSS-REFERENCE TO RELATED DISCLOSURES

This application is a National Stage Application of PCT International Application PCT/CN2020/124355 filed on Oct. 28, 2020, which claims priority to Chinese patent application No. 202010305885.1 filed with the CNIPA on Apr. 17, 2020, entitled "DATA FLOW TABLE PROCESSING METHOD AND DEVICE FOR HIGH-SPEED LARGE-SCALE CONCURRENT DATA FLOWS", the entire contents of which are incorporated herein by reference.

TECHNICAL FIELD

The present disclosure relates to the technical field of network communications, and in particular, to a data flow table for high-speed large-scale concurrent data flows, a method and a device for processing the data flow table, and a storage medium.

BACKGROUND

A data flow table used in present network communication techniques is mainly utilized to store state information of each data flow in the network, and is also one of the basic components to implement network functions such as packet forwarding, traffic classification, network intrusion detection, network traffic and user behavior analysis, network address translation, and traffic accounting. A processing efficiency of the data flow table has an important impact on actual performance of the above network functions.

At present, with the rapid development of the cloud computing and the Network Functions virtualization (NFV) technologies, achieving high-performance network functions based on a common server platform and using a software has become one of the industry's top concerns. The number of concurrent data flows in the network is increasing as a rate of the network link increases, which leads to a reduction of available processing time for each packet. However, a current method of implementing the large-scale data flow table with classical hash tables brings the following two problems. First, the classical hash table needs a relatively low load rate to reduce the conflict probability, which leads to a low space efficiency. Therefore, a waste of the storage space is heavy when the scale of the data flow table is large. Second, time consumed for table lookup may be relatively long under a worst condition since the classical hash table uses open addressing or chaining to deal with hash collisions, which may cause system performance fluctuations, and packet loss may easily occur in high-speed network environments.

Therefore, in current improvement solutions, a hash algorithm with higher space efficiency and more stable table lookup performance is further adopted by high-performance packet processing software. For example, an open-source packet processing software library Data Plane Development Kit (DPDK), which is widely used in the industry, uses the cuckoo hash table to implement the data flow table. Although the cuckoo hash table has high space efficiency and stable update performance, it may need to move multiple existing records in the table when inserting a new flow record, which consumes long insertion time. Especially when dealing with huge amount of concurrent data flows, the uncertainty operation time of the data flow table in high-speed networks leads to increased delay in packet processing, and even causes packet loss.

SUMMARY

Exemplary embodiments of the present disclosure provide a method and a device for processing a data flow table for high-speed, large-scale concurrent data flows, which can avoid the problems of prolonged packet processing delays and even packet loss caused by the instability of the operation time of a data flow table in a high-speed network.

In an aspect, the embodiments of the present disclosure provide a data flow table. The data flow table includes:
  a fingerprint table configured to store a data flow fingerprint of a data flow to be inserted, where the fingerprint table adopts a d-left hash table, and is divided into two blocks, each block includes at least two buckets, and the buckets are configured to store basic units;
  a record table configured to store a data flow record of the data flow to be inserted, where the record table adopts the d-left hash table, and is divided into two blocks, each block includes at least two buckets, the buckets are configured to store basic units, and the basic units in the record table and the basic units in the fingerprint table are in one-to-one correspondence; and
  an overflow table configured to store the data flow to be inserted if the data flow record of the data flow to be inserted is not able to be inserted to the record table.

In an embodiment, a quantity of the basic units in each bucket is no more than a depth of the bucket in which the basic units are located.

In an embodiment, a depth of the buckets of the fingerprint table is equal to a depth of the buckets of the record table.

In an embodiment, the basic units in the buckets of the fingerprint table are configured to store data flow fingerprints, and the basic units in the buckets of the record table are configured to store data flow records.

In an embodiment, the data flow record is a four-tuple, which includes a data flow identifier, a data flow state, a flow counter of the data flow, and metadata which is configured to represent a format.

In an embodiment, the data flow identifier is a five-tuple, which includes a source IP address, a destination IP address, a protocol number, a source port number and a destination port number.

In an embodiment, the data flow identifier is configured to be input to a hash function to output the data flow fingerprint.

In an embodiment, the overflow table is a single function hash table.

In an embodiment, a basic unit with a highest access frequency in each bucket of the record table is located at a bottom of the bucket.

In another aspect, the embodiments of the present disclosure further provide a method for processing a data flow table, the method includes:
  acquiring, according to a data flow identifier of the data flow to be inserted, addresses of candidate buckets in each block of the fingerprint table of the data flow table and a data flow fingerprint corresponding to the data flow identifier, the addresses of the candidate buckets in the fingerprint table being the same as the addresses of the candidate buckets in the record table;

detecting whether there is an idle unit in the candidate buckets of the fingerprint table, and selecting the candidate bucket having the idle unit as a target bucket if there is an idle unit; and searching for the idle unit sequentially from a bottom unit to a top unit of the target bucket, and if the idle unit is found in the target bucket, writing the data flow fingerprint of the data flow to be inserted into the found idle unit, and writing the data flow record of the data flow to be inserted into a record bucket of the record table corresponding to the target bucket.

In an embodiment, the detecting whether there is an idle unit in the candidate buckets of the fingerprint table includes: inserting the data flow record of the data flow to be inserted into the overflow table if the idle unit is not found in the candidate buckets, and terminating an insertion process.

In an embodiment, the detecting whether there is an idle unit in the candidate buckets of the fingerprint table includes: selecting the candidate bucket with more idle units as the target bucket if the idle unit is found in each of the candidate buckets and quantities of the idle units in the candidate buckets are different; and/or selecting the candidate bucket in a first block as the target bucket if the idle unit is found in each of the candidate buckets and quantities of the idle units in the candidate buckets are the same.

In an embodiment, the acquiring the data flow fingerprint corresponding to the data flow identifier according to the data flow identifier of the data flow to be inserted comprises: inputting the data flow identifier into a cyclic redundancy check algorithm to output the data flow fingerprint.

In an embodiment, before acquiring, according to a data flow identifier of the data flow to be inserted, addresses of candidate buckets in each block of the fingerprint table of the data flow table and a data flow fingerprint corresponding to the data flow identifier, the method further includes: performing cache alignment to the data flow table.

In an embodiment, the method further includes: placing the basic unit, which has a highest access frequency in each bucket of the record table, at a bottom of the bucket.

In an embodiment, the method further includes: calculating addresses of candidate buckets and a data flow fingerprint which correspond to a data flow to be looked up, according to a data flow identifier of the data flow to be looked up; and searching for a data flow record corresponding to the data flow identifier of the data flow to be looked up in the data flow table.

In an embodiment, the method further includes: searching, according to a data flow identifier of a data flow used for update, a corresponding data flow record in the data flow table; and in response to finding the corresponding data flow record, updating fields of the found data flow record to be the same as corresponding fields of the data flow used for update.

In an embodiment, the method further includes: searching a corresponding data flow record in the data flow table according to a data flow identifier of a data flow to be deleted; and in response to finding the corresponding data flow record, resetting the found corresponding data flow record to zero.

In another aspect, the embodiments of the present disclosure further provide a device for processing a data flow table, which includes:

a data flow insertion module configured to acquire, according to a data flow identifier of the data flow to be inserted, addresses of candidate buckets in each block of the fingerprint table of the data flow table and a data flow fingerprint corresponding to the data flow identifier, wherein the addresses of the candidate buckets in the fingerprint table are the same as the addresses of the candidate buckets in the record table; and a processing module, configured to: detect whether there is an idle unit in the candidate buckets of the fingerprint table, and select the candidate bucket having the idle unit as a target bucket if there is an idle unit; and search for the idle unit sequentially from a bottom unit to a top unit of the target bucket, and if the idle unit is found in the target bucket, write the data flow fingerprint of the data flow to be inserted into the found idle unit, and write the data flow record of the data flow to be inserted into a record bucket of the record table corresponding to the target bucket.

In an embodiment, the processing module is further configured to insert the data flow record of the data flow to be inserted into the overflow table if the idle unit is not found, and an insertion process is finished.

In an embodiment, the data flow table of each data flow includes the fingerprint table, the record table, and the overflow table. In each data flow table, the fingerprint table and the record table both adopt a d-left hash table, and each are divided into two blocks. Each block of the fingerprint table and the record table includes at least two buckets, each bucket is configured to store basic units. A quantity of the basic units in each bucket is less than or equal to a depth of the bucket in which the basic units are located. A depth of the buckets of the fingerprint table is equal to a depth of the buckets of the record table.

In an embodiment, the basic units in the buckets of the fingerprint table are the data flow fingerprints. Contents of fields of the data flow identifier of each data flow includes: a source IP address, a destination IP address, a protocol number, a source port number and a destination port number. The acquiring the data flow fingerprint of the fingerprint table according to the data flow identifier of the data flow to be inserted includes: inputting the data flow identifier into a cyclic redundancy check algorithm to output the data flow fingerprint.

In an embodiment, the device further includes a lookup module configured to: calculate the addresses of the buckets of the data flow to be looked up and the data flow fingerprint, determine the basic units of the buckets in the fingerprint table using the calculated addresses of the buckets, and search the data flow identifier matching the calculated data flow fingerprint from the determined basic units. If the data flow identifier matching the calculated data flow fingerprint is not found in the candidate buckets of the fingerprint table, the data flow identifier matching the calculated data flow fingerprint is further searched in the overflow table.

In another aspect, the embodiments of the present disclosure further provide a computer-readable storage medium, on which a computer program is stored, when the computer program is executed by a processor, steps of the method in the above embodiments are executed.

By means of the data flow table for high-speed, large-scale concurrent data flow and the processing method and device thereof, and the storage medium provided in the present disclosure, the data flow table is divided into the fingerprint table, the record table, and the overflow table. The fingerprint table and the record table are designed based on the d-left hash table, such that the fingerprint table and the record table each contains two blocks, each block includes several buckets, and each bucket stores multiple base units. The basic units stored in the fingerprint table are the data flow fingerprints, and the basic units stored in the record table are the entire data flow records. The basic units of the fingerprint table and the basic units of the record table correspond to each other. The overflow table is a classical single function hash table which is configured to store the data flow records that cannot be inserted into the record table. The data structure of the data flow table is designed to make full use of the cache alignment techniques to achieve a high cache utilization. The present disclosure has a high space efficiency and can support large amount of concurrent data flows, meanwhile the problems of prolonged packet processing delays and even packet loss caused by the instability of the operation time of a data flow table in a high-speed network is prevented.

BRIEF DESCRIPTION OF THE DRAWINGS

In order to illustrate the technical solutions in the embodiments of the present disclosure more clearly, the accompanying drawings used in the description of the embodiments are briefly introduced below. Apparently, the accompanying drawings in the following description are only for some embodiments of the present disclosure. For those of ordinary skill in the art, other drawings can also be derived from these drawings without creative effort.

DETAILED DESCRIPTION OF THE EMBODIMENTS

In order to enable those skilled in the art to better understand the technical solution of the present disclosure, the present disclosure is further detailed below in combination with the drawings and specific embodiments. The embodiments of the present disclosure are described in detail below. Examples of the embodiments are shown in the accompanying drawings, in which the same reference numerals represent the same or similar components, or components with the same or similar functions.

The embodiments described below with reference to the accompanying drawings are exemplary, and are only used to explain the present disclosure rather than to limit the present disclosure.

It should be understood by those skilled in the art that, unless specifically stated, the singular forms "a" and "an" used herein may indicate multiple as well.

It should be further understood that the word "include" used in the specification of the present disclosure refers to the presence of a stated feature, integer, step, operation, element and/or component, but does not preclude the presence or addition of one or more other features, integers, steps, operations, elements, components and/or combinations thereof. As used herein, the term "and/or" includes any one and any combinations of multiple associated listed items.

It should be understood that when it is recited that an element is "connected" or "coupled" to another element, the element may be directly connected or coupled to the other element, or connected or coupled to the other element via an intervening element. Furthermore, the "connected" or "coupled" as used herein may include wirelessly connected or coupled.

It should be understood by those of ordinary skill in the art that, unless otherwise defined, all terms (including technical terms and scientific terms) used herein have the same meanings as commonly understood by one of ordinary skill in the art to which this disclosure belongs. It should also be understood that the terms such as those defined in general dictionaries should be construed to have meanings consistent with their meanings in a context of the prior art.

The data flow table provided in the embodiments of the present disclosure is configured to store state information of each data flow in the network. Each item in the data flow table is actually one piece of data flow record. For example, one piece of data flow record may be represented by a four-tuple <Flow_ID, State, Meter, Metadata>, here, Flow_ID refers to a data flow identifier (usually represented by a five-tuple), State refers to a data flow state, Meter refers to a flow counter, and Metadata refers to metadata which is configured to represent a specific format of the items in table. It should be noted that the four-tuple or the five-tuple in the present disclosure refers to a set having multiple fields. For example, the four-tuple refers to a set having four fields, and the five-tuple refers to a set having five fields. General operations to the data flow table includes the following steps. Once a data packet is received, the data packet is first parsed, and the data flow identifier (Flow_ID) is extracted from a header field of the data packet. Then, by using the data flow identifier as a lookup keyword, the data flow record corresponding to the data flow identifier is obtained by looking up the data flow table. Next, the data flow record is parsed to obtain the data flow state (State) and the flow counter (Meter) according to the metadata (Metadata) in the data flow record. Finally, the flow counter is updated, and the flow state may need to be updated as well.

At present, the data flow tables are also used in data flow processing scenarios. For example, a traditional cuckoo hash table may be used to implement the data flow table scheme. The exemplary embodiments provided in the present disclosure are improvements to the scenarios in which the data flow tables are used for processing the data flows. The improvements include but are not limited to improvement to a structure of the data flow table, and improvements to processes of writing, looking up, updating and deleting of the data flow table. The solutions provided by the exemplary embodiments of the present disclosure may be applied to most data flow table processing scenarios. No matter in a cloud, a server side, a network transceiver, or other hardware environments of network communication, as long as the general processing of the data flow is compliant and devices and scenario conditions for processing the data flow tables exist, improvements to hardware, software or a combination thereof can be made according to the design ideas of the exemplary embodiments of the present disclosure, which are not limited herein.

Figure 4:
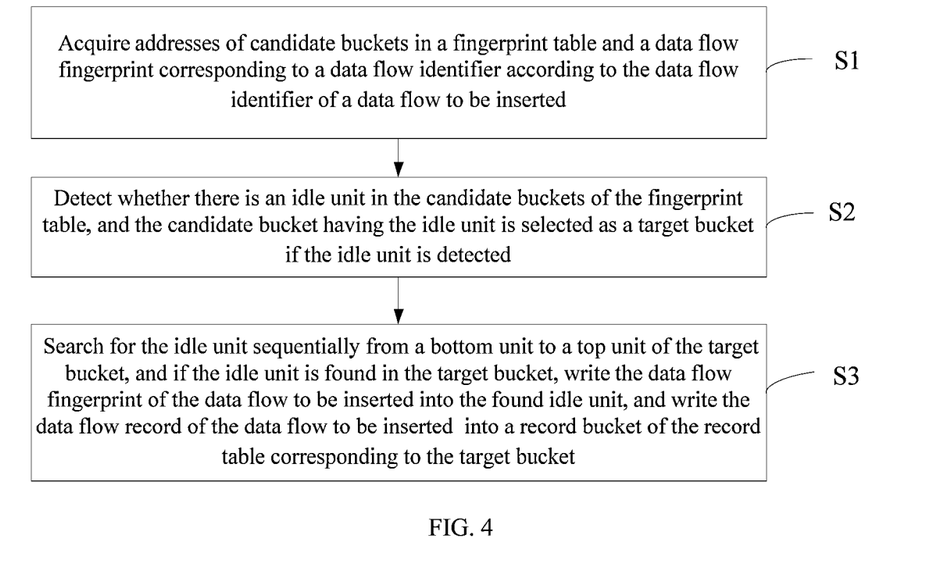
FIG. 4 is a schematic flowchart of an insertion process of a method for processing a data flow table according to an embodiment of the present disclosure.

An embodiment of the present disclosure provides a method for processing a data flow table of high-speed and large-scale concurrent data flows. As shown in FIG. 4, the method includes the following steps.

At step S1, addresses of candidate buckets in a fingerprint table and a data flow fingerprint corresponding to the data flow identifier are acquired according to the data flow identifier of a data flow to be inserted.

As described above, the data flow table includes the fingerprint table, a record table and an overflow table. The fingerprint table and the record table are both designed based on a d-left hash table, so that the fingerprint table and the record table each contain two blocks, each block contains several buckets, and each bucket stores multiple basic units. The basic units in the fingerprint table are data flow fingerprints, and the basic units in the record table are data flow records. The basic units in the fingerprint table are in one-to-one correspondence with the basic units in the record table.

It should be noted that a complete insertion process needs to access the fingerprint table and the record table in turn, and optional buckets to be inserted are called "candidate buckets". Since the buckets in the fingerprint table and the buckets in the record table are in one-to-one correspondence, the addresses of the candidate buckets in the fingerprint table are the same as the addresses of the candidate buckets in the record table. In other words, locations of the candidate buckets in the record table can be determined once locations of the candidate buckets in the fingerprint table are determined.

In the embodiment, an insertion of the data flow requires to determine the addresses of the candidate buckets. In detail, the data flow identifier of the data flow to be inserted is extracted. The data flow identifier may be represented as Flow_ID. Then, the addresses of the candidate buckets in the two blocks of the fingerprint table are calculated by means of hash functions $h_1$ and $h_2$, respectively, based on the data flow identifier Flow_ID. The hash functions $h_1$ and $h_2$ both refer to hash functions used in the calculation. A person skilled in the art shall know how to select the hash functions $h_1$ and $h_2$. The addresses of the candidate buckets in the two blocks of the fingerprint table are i and j, respectively, i is the address of the candidate bucket in a first block, and j is the address of the candidate bucket in a second block:

$i=h_1(\text{Flow\_ID})$, $j=h_2(\text{Flow\_ID})$.

The buckets in the fingerprint table and the buckets in the record table are in a one-to-one correspondence since the basic units in the fingerprint table and the basic units in the record table are in a one-to-one correspondence. Therefore, the addresses of the candidate buckets of the two blocks in the record table are i and j correspondingly.

Next, the data flow fingerprint corresponding to the data flow identifier is calculated. In detail, a 32-bit data flow fingerprint is calculated according to the data flow identifier Flow_ID by means of a hash function (e.g., a 32-bit cyclic redundancy check algorithm hash function, CRC-32). The data flow fingerprint is represented as ff. A valid data flow fingerprint ff must be greater than zero.

At step S2, it is detected whether an idle unit exists in the candidate buckets of the fingerprint table, and the candidate bucket having the idle unit is selected as a target bucket if the idle unit is detected.

A basic unit of the fingerprint table is determined as an idle unit if the data flow fingerprint in the basic unit of the fingerprint table is equal to zero. A basic unit of the fingerprint table is determined as a non-idle unit if the data flow fingerprint in the basic unit of the fingerprint table is greater than zero. A process of determining the target bucket includes the following steps. Quantities of idle units in the candidate buckets $FB_i$ and $FB_j$ in the fingerprint table are checked. The candidate buckets $FB_i$ and $FB_j$ are both determined as full if the basic units in the candidate buckets $FB_i$ and $FB_j$ are all non-idle units, and in this situation, the data flow record of the data flow to be inserted is inserted into the overflow table, and the insertion is finished. If both the candidate buckets $FB_i$ and $FB_j$ are not full, one of the candidate buckets $FB_i$ and $FB_j$ having more idle units is selected as the target bucket. If the candidate buckets $FB_i$ and $FB_j$ have the same quantity of the idle units, the bucket in the first block is preferentially selected as the target bucket. In the embodiment, the candidate bucket $FB_i$ is the target bucket.

It should be noted that, as described above, the valid data flow fingerprint needs to be greater than zero, and the data flow fingerprint of the idle units are represented as zero, in other words, the quantity of the idle units may be calculated according to the quantity of the basic units with a value of zero. Thus, the bucket with more idle units is a bucket with more basic units whose value is zero. However, in other embodiments, the bucket with more idle units may alternatively be a bucket in which the quantity of the basic units with the value of zero is larger than a certain threshold (e.g., more than 5 basic units with the value of zero, i.e., indicating that the quantity of the idle units in the bucket is larger than 5).

At step S3, an idle unit is searched for sequentially from a bottom unit to a top unit of the target bucket, and in case of finding the idle unit in the target bucket, the data flow fingerprint of the data flow to be inserted is written into the found idle unit, and the data flow record of the data flow to be inserted is written into a record bucket of the record table corresponding to the target bucket.

It should be understood that, in a process of determining an insertion position, the target bucket $FB_i$ may include, for example, 8 units, the bottom unit is $FB_i[0]$, and the top unit is $FB_i[7]$. A search operation starts from the bottom unit $FB_i[0]$ and goes up to find a first idle unit (the idle unit with the value of zero). In the embodiment, the found first idle unit (i.e., a target unit) is $FB_i[k]$. It should be understood that, during writing into the target unit, the data flow fingerprint to be inserted is written into the target unit $FB_i[k]$, and the data flow record of the data flow to be inserted is written into a corresponding record unit $RB_i[k]$ of the record bucket $RB_i$ and the insertion is finished.

Furthermore, the step S2 further includes: inserting the data flow record of the data flow to be inserted into the overflow table if there is no idle unit in the candidate buckets, and the insertion process is finished.

The solution provided in the embodiment is mainly applied to the scenarios with high-speed networks and large-scale concurrent data flows. The data flow table performance is improved by using the d-left hash table construction. In the embodiment, the data flow table may support insertion, lookup, update and deletion operations of the data flow records. Besides, the data flow table may support both IPv4 and IPv6. The data flow table in the embodiment has high space efficiency and stable update performance. In addition, in the present disclosure, inserting new data flows into the data flow table without moving existing records in the table provides a stable insertion performance.

Taking a process of inserting a new data flow <Flow_ID, State, Meter, Metadata> into the data flow table as an example, the insertion process may include the following steps.

1) The addresses of the candidate buckets are obtained by performing a hash calculation to the data flow identifier of the data flow to be inserted. The addresses of the candidate buckets corresponding to the data flow identifier Flow_ID in the two blocks are obtained by the hash functions h1 and h2, respectively. For example, the address of the candidate bucket in the first block is i and the address of the candidate bucket in the second block is j.

2) The data flow fingerprint corresponding to the data flow identifier is calculated by performing a hash calculation to the data flow identifier. The 32-bit data flow fingerprint of the data flow identifier Flow_ID is calculated by means of a hash function $f$. For example, the 32-bit data flow fingerprint is ff. A valid data flow fingerprint must be greater than zero, and the data flow fingerprint of an idle unit is represented by a value of zero.

3) The target bucket in the fingerprint table is determined according to the quantity of idle units in the candidate buckets. The quantities of the idle units in the candidate buckets $FB_i$ and $FB_j$ in the fingerprint table are checked. The data flow record to be inserted is inserted into the overflow table if the candidate buckets $FB_i$ and $FB_j$ are both full, i.e., there are no idle units in both of the candidate buckets $FB_i$ and $FB_j$, and the insertion is finished. One of the candidate buckets $FB_i$ and $FB_j$ with more idle units is selected as the target bucket if both the candidate buckets $FB_i$ and $FB_j$ are not full. If the candidate buckets $FB_i$ and $FB_j$ have the same quantity of the idle units, the candidate bucket $FB_i$ in the first block is preferentially selected as the target bucket. In an embodiment, the candidate bucket $FB_i$ is selected as the target bucket.

4) The insertion position of the data flow to be inserted is determined. For example, the target bucket $FB_i$ includes 8 units, the bottom unit is $FB_i[0]$, and the top unit is $FB_i[7]$. A search operation starts from the bottom unit $FB_i[0]$ and goes up to find the first idle unit (the idle unit with the value of zero) as the target unit. For example, the target unit is $FB_i[k]$.

5) The data flow fingerprint of the data flow to be inserted is written into the target unit, and the data flow record of the data flow to be inserted is written into the corresponding basic unit in the record table. For example, the data flow fingerprint of the data flow to be inserted is written into the target unit $FB_i[k]$, and the data flow record of the data flow to be inserted is written into the corresponding record unit $RB_i[k]$ of the record bucket $RB_i$, i.e.:

$FB_i[k] \leftarrow ff$, $RB_i[k] \leftarrow$ <Flow_ID,State,Meter,Metadata>, then, the insertion is finished.

Embodiments of the present disclosure further provide an improved solution to the data flow table. The data flow table logically includes a fingerprint table, a record table, and an overflow table. In each data flow table, the fingerprint table and the record table each use the d-left hash table. The fingerprint table and the record table each include two blocks, and each block includes at least two buckets, and each bucket is configured to store basic units. The quantity of the basic units in each bucket is no more than a depth of the bucket in which the basic units are located. A bucket of the fingerprint table and a corresponding bucket of the record table have the same depth. It should be understood that the depth of the bucket indicates a maximum capacity of the bucket.

Figure 1:
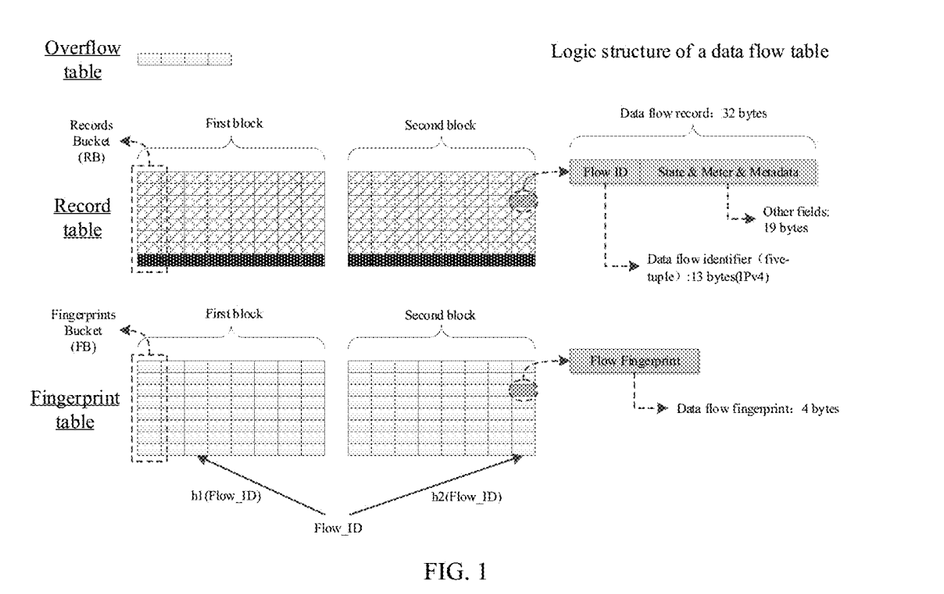
FIG. 1 is a schematic diagram of a logical structure of a data flow table according to an embodiment of the present disclosure.

In detail, the data flow table may be divided into the fingerprint table, the record table and the overflow table in logic. Both the fingerprint table and the record table are implemented using the d-left hash table, and d is equal to two, i.e., the fingerprint table and the record table are both divided into two blocks. The two blocks are referred to as the first block and the second block, respectively. Each block of the fingerprint table and the record table includes several buckets, and each bucket may store several basic units, and the quantity of the basic units in each bucket does not exceed the depth of the bucket. The corresponding buckets of the fingerprint table and the record table have the same depth, and the basic units of the fingerprint table and the record table are in one-to-one correspondence. For example, as shown in FIG. 1, the units in the fingerprint table and the record table are in one-to-one correspondence, and each table is divided into two blocks, each block includes multiple buckets, and each bucket has a depth of eight.

Furthermore, the basic units in the buckets of the fingerprint table are the data flow fingerprints. The fields of the data flow identifier of each data flow include: a source IP address, a destination IP address, a protocol number, a source port number and a destination port number. A process of obtaining the data flow fingerprint to be inserted to in the fingerprint table according to the data flow identifier of the data flow to be inserted includes: inputting the data flow identifier into a cyclic redundancy check (CRC) algorithm to obtain the data flow fingerprint.

In detail, the basic units stored in the buckets of the fingerprint table are the data flow fingerprints. A length of each data flow fingerprint is 32 bits. Each data flow has a unique data flow identifier. The data flow identifier may be represented as a five-tuple consisting of the fields <source IP address, destination IP address, protocol number, source port number, destination port number> in a header of a packet. The data flow fingerprint is obtained by performing a hash calculation on the data flow identifier. The specific hash calculation is not limited in the present disclosure, for example, a 32-bit cyclic redundancy check algorithm (CRC-32) may be used to calculate the data flow fingerprint. An input of the calculation is the data flow identifier, and an output of the calculation is the 32-bit data flow fingerprint.

Figure 3:
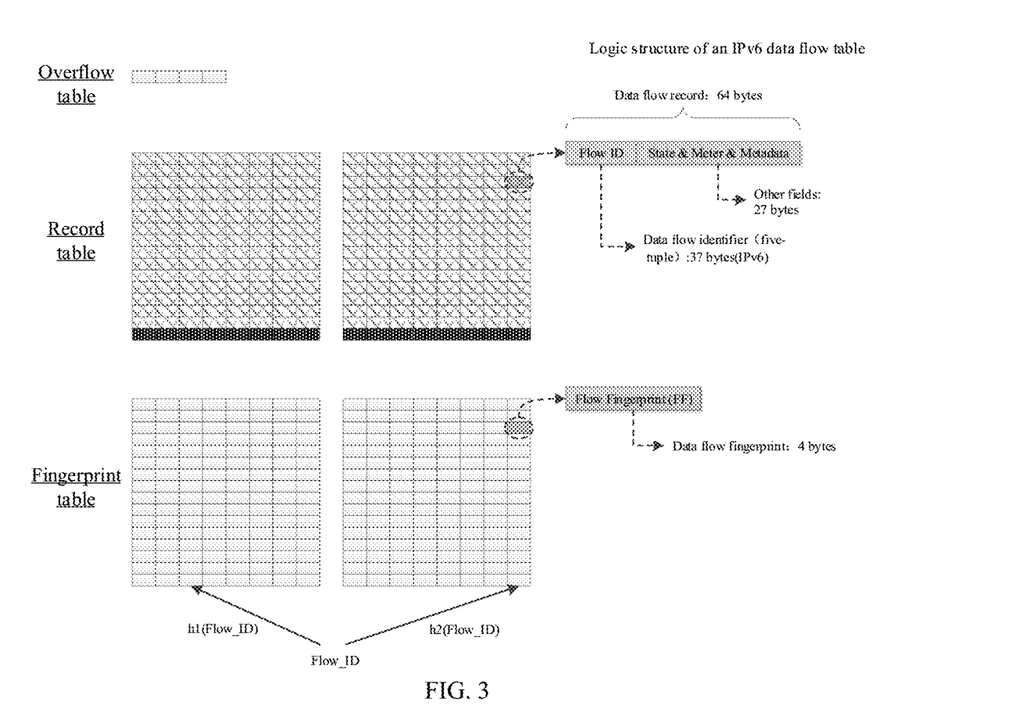
FIG. 3 is a schematic diagram of a logical structure of an IPv6 data flow table according to an embodiment of the present disclosure.

The basic units stored in the buckets of the record table are data flow records. The four-tuple <Flow_ID, State, Meter, Metadata> may be used to represent the data flow records. Flow_ID refers to the data flow identifier, State refers to the state of the data flow, Meter refers to the flow counter of the data flow, and Metadata refers to the metadata which is configured to represent the specific format of the items in the table. A record length of an IPv4 data flow table is 32 bytes, and a record length of an IPv6 data flow table is 64 bytes, as shown in FIG. 3.

The overflow table is implemented using a classic single function hash table, which handles the hash conflicts by the open addressing. The overflow table stores the data flow records to be inserted that cannot be inserted into the record table. For example, in an embodiment as shown in FIG. 1, the basic units in each bucket of the fingerprint table are data flow fingerprints. The data flow fingerprints are obtained by performing the hash calculation to the data flow identifiers. The length of each data flow fingerprint is 32 bits. The basic units stored in each bucket of the record table are the data flow records. As described above, the data flow records may be represented as the four-tuple <Flow_ID, State, Meter, Metadata>. The data flow identifier Flow ID is the keyword to lookup the table. The data flow identifier is generally consisting of the five-tuple <source IP, destination IP, protocol number, source port number, destination port number>. The length of each data flow record is constant 32 bytes, in which the flow identifier takes up 13 bytes and the other fields take up 19 bytes. The overflow table is a classic single function hash table, which uses open addressing or chaining to deal with the hash conflicts. The basic units stored in the overflow table, like in the record table, are also data flow records.

When a new data flow needs to be inserted into the data flow table, first, the hash functions $h_1$ and $h_2$ are used to perform the hash calculation to the data flow identifier to obtain the addresses of the candidate buckets in the two blocks for the new record. Next, the candidate bucket with more idle units is selected from the two candidate buckets as the target bucket. Then, the data flow fingerprint of the data flow to be inserted is written into the target bucket of the fingerprint table, and the data flow record of the data flow to be inserted is written into the record bucket, which corresponds to the address of the target bucket of the fingerprint table, of the record table. The basic units in the record table and the basic units in the fingerprint table have a one-to-one correspondence.

It should be note that the data flow record of the data flow to be inserted is inserted to the overflow table if the two candidate buckets are both full when selecting the target bucket from the two candidate buckets of the fingerprint table.

Figure 2:
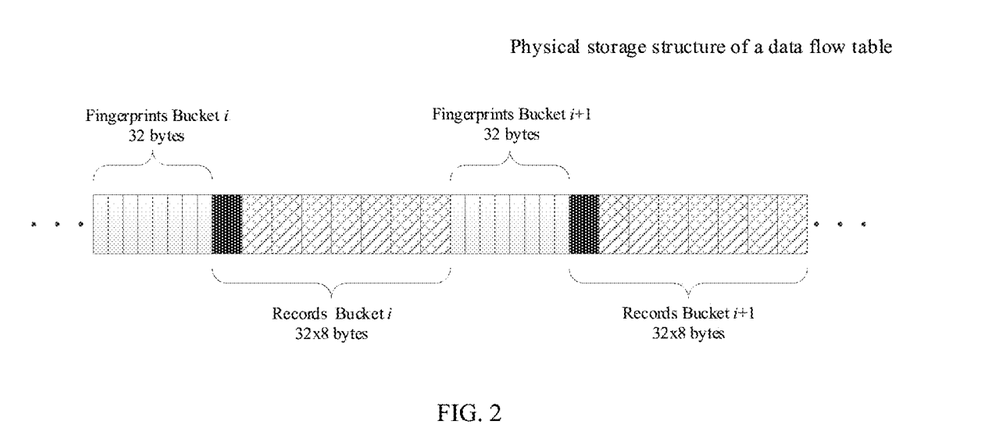
FIG. 2 is a schematic diagram of a physical storage structure of a data flow table according to an embodiment of the present disclosure.

In actual use, the physical storage structure of the data flow table in a memory is shown in FIG. 2. The buckets of the fingerprint table and the buckets of the record table are stored alternately in the physical structure of the memory. At present, since a size of a cache line of a processor in a mainstream server is usually 64 bytes, the entire data flow table needs to be subjected to cache alignment, e.g., 64-byte alignment, when stored in order to improve the cache reading efficiency. After the cache alignment, all the basic units in the target bucket of the fingerprint table and the bottom unit in the corresponding record bucket in the record table (the records represented by the dark grid lines in FIG. 2) may be obtained in a single memory reading.

The method for processing the data flow table for the high-speed and large-scale concurrent data flows provided in the present disclosure may further include: placing the basic unit, which has a highest access frequency in each bucket of the record table, at the bottom of the bucket. By means of this "in-bucket replacement" mechanism of the data flow table, the whole target bucket of the fingerprint table and the bottom unit in the corresponding record bucket can be read into the cash together in a single memory reading, which further improves the cache reading efficiency. The implementation details of the in-bucket replacement mechanism is described in detail below.

In the embodiment, the overflow table is stored separately in the memory, and may also perform the cache alignment.

In the embodiment, the data flow table may be divided into the fingerprint table, the record table and the overflow table. The fingerprint table and the record table are both designed based on the d-left hash table. The fingerprint table and the record table each include two blocks, each block includes a number of buckets, each bucket stores a number of base units. The basic units of the fingerprint table and the basic units of the record table have one-to-one correspondence. The basic units stored in the fingerprint table are the data flow fingerprints, and the basic units stored in the record table are the data flow records. The overflow table is the classical single function hash table, which is configured to store the data flow records that cannot be inserted into the record table. A data structure of the data flow table is designed to take full advantage of the cache alignment technique to obtain high cache utilization. Furthermore, an embodiment of the present disclosure also provides the in-bucket replacement mechanism for placing the data flow records with high access frequencies at bottoms of respective buckets of the record table, so that the record in the bottom of the bucket may be read into the cache at the same time as the data flow fingerprint is read, thus a high cache read performance is achieved. The present disclosure not only achieves high space efficiency and can support massive concurrent data flows, but also avoids the increase of the packet processing delay and packet loss caused by the unstable operation time of the data flow table in high-speed networks.

Based on the data flow table provided in the embodiment, the method for processing the data flow table provided in embodiments of the present disclosure may further include processes such as lookup, update and deletion.

Figure 5:
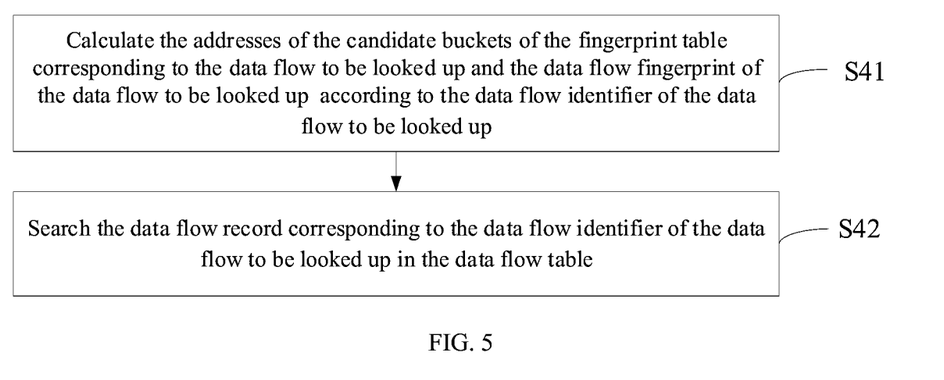
FIG. 5 is a schematic flowchart of a lookup process of a method for processing a data flow table according to an embodiment of the present disclosure.

In detail, as shown in FIG. 5, the method for processing the data flow table may include a lookup process. The lookup process includes the following steps.

At step S41, addresses of candidate buckets of the fingerprint table corresponding to a data flow to be looked up and the data flow fingerprint corresponding to the data flow to be looked up are calculated according to the data flow identifier of the data flow to be looked up.

At step S42, the data flow record corresponding to the data flow identifier of the data flow to be looked up is searched in the data flow table.

In detail, after the addresses of the candidate buckets are calculated by the hash calculation, respective basic units in the candidate buckets of the fingerprint table are determined, and a data flow identifier matching the calculated data flow fingerprint is searched from the respective determined basic units. If no data flow identifier matching the calculated data flow fingerprint can be found in the candidate buckets of the fingerprint table, a data flow identifier matching the calculated data flow fingerprint is further searched in the overflow table.

The purpose of the lookup process is to find the corresponding flow record in the data flow table according to the data flow identifier Flow_ID of the data flow to be looked up. In detail, the lookup process includes the following steps.

1.1) The addresses of the candidate buckets are calculated according to the data flow identifier. In detail, by means of the hash functions h1 and h2, the addresses of the candidate buckets corresponding to the data flow identifier Flow_ID in the two blocks are calculated, respectively. For example, the address of the bucket corresponding to the data flow identifier Flow_ID in the first block is i, and the address of the bucket corresponding to the data flow identifier Flow_ID in the second block is j.

1.2) The data flow fingerprint is calculated by performing hash calculation to the data flow identifier. The 32-bit data flow fingerprint of the data flow identifier Flow_ID is calculated by the hashing function $f$. For example, the data flow fingerprint is ff.

1.3) The data flow record corresponding to the data flow identifier of the data flow to be looked up is searched. The basic units of the two candidate buckets $FB_i$ and $FB_j$ of the fingerprint table are searched one by one. If one basic unit in one candidate bucket is equal to the data flow fingerprint ff, i.e., $FB_x[y](x=i$ or j, y=0 ... 7) is equal to ff, the data flow identifier would be read from the corresponding unit $RB_x[y]$ of the record bucket and be record as $RB_x[y]$.flow_id. The lookup process is determined as successful if RBx[y].flow_id is equal to Flow_ID, and the lookup process is finished. If $RB_x[y]$.flow_id is not equal to Flow_ID, the next unit of the candidate bucket of the fingerprint table is further searched. This step is repeated until all units of the two candidate buckets are searched.

1.4) The overflow table is looked up if the contents of all units in the two candidate buckets $FB_i$ and $FB_j$ are not equal to ff. If a data flow record matching the data flow identifier is found, the lookup process is returned as successful and finished.

If the data flow record matching the data flow identifier is not found, the lookup process is returned as failed and finished.

The processing method provided by the embodiments of the present disclosure may also include an update process. The purpose of the update process is to search a corresponding data flow record in the data flow table according to the data flow identifier Flow_ID of a data flow used for update, and to update the State field and the Meter field of the data flow record.

Figure 6:
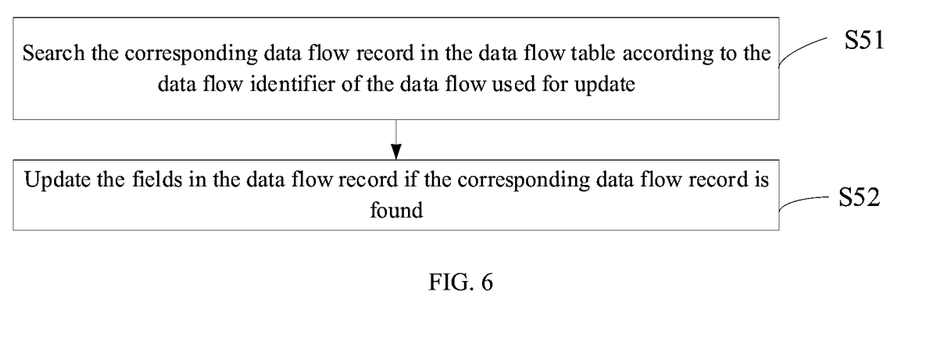
FIG. 6 is a schematic flowchart of an update process of a method for processing a data flow table according to an embodiment of the present disclosure.

In detail, as shown in FIG. 6, the update process includes the following steps.

At step S51, the corresponding data flow record is searched in the data flow table according to the data flow identifier of the data flow used for update.

At step S52, fields in the data flow record are updated if the corresponding data flow record is found. The update is returned as successful, and the update process is finished. For example, the State field and the Meter field of the data flow record in the target unit $RB_i[k]$ are updated if the corresponding data flow record is found.

Step S54, the update is returned as failed if the corresponding data flow record is not found, and the update process is finished.

The update process may also include step S53.

At step S53, the in-bucket replacement is performed. If the target unit, in which the found corresponding data flow record is located, is not the bottom unit of the bucket in which the target unit is located, the field Meter of the data flow record in the target unit is compared with the Meter field of the bottom unit of the bucket in which the target unit is located. The contents of the data flow record in the target unit are exchanged with the contents of the bottom unit if the Meter field of the data flow record in the target unit is greater than the Meter field of the bottom unit, or if the Meter field of the bottom unit is empty. In detail, if the target unit $RB_i[k]$ is not the bottom unit (i.e., k>0), the Meter field of the data flow record in the target unit $RB_i[k]$ is compared with the Meter field of the data flow record in the bottom unit $RB_i[0]$ of the bucket in which the target unit $RB_i[k]$ is located. The contents of $RB_i[k]$ and $RB_i[0]$ are exchanged and the contents of $FB_i[k]$ and $FB_i[0]$ are exchanged if $RB_i[k]$.Meter is greater than $RB_i[0]$.Meter, or if $RB_i[0]$ is empty, i.e.:

temp←RBi[0],

RBi[0]←RBi[k],

RBi[k]←temp, temp←FBi[0],

FBi[0]←FBi[k],

FBi[k]←temp.

The processing method may further include a deletion process. The purpose of the deletion process is to find a corresponding data flow record in the data flow table according to the data flow identifier Flow_ID of a data flow to be deleted, and zero out the corresponding data flow record.

Figure 7:
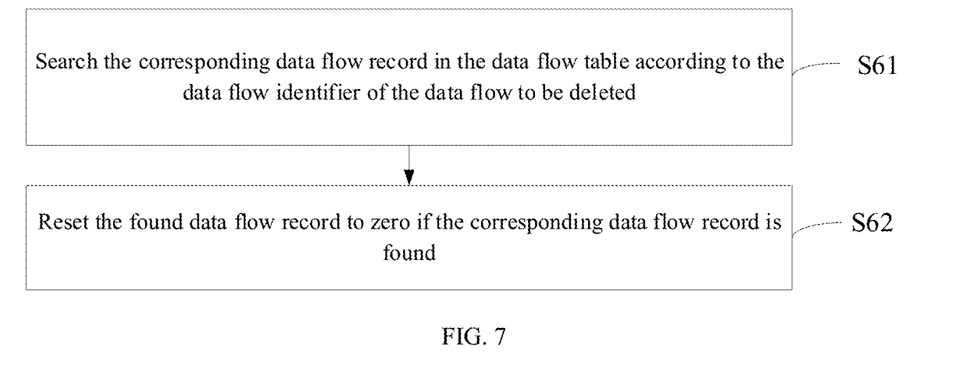
FIG. 7 is a schematic flowchart of a deletion process of a method for processing a data flow table according to an embodiment of the present disclosure.

In detail, as shown in FIG. 7, the deletion process includes the following steps.

At step S61, a corresponding data flow record is searched in the data flow table according to the data flow identifier of a data flow to be deleted.

At step S62, if the corresponding data flow record is found, the found data flow record is reset to zero, the deletion is returned as successful, and the deletion process is finished. In detail, the found data flow record in the target unit (e.g., $RB_i[k]$) is zeroed out, i.e.:

$FB_i[k]$←0, $RB_i[k]$←<0,0,0,0>.

The deletion process may further include the following step.

At step S63, the deletion is returned as failed if the corresponding data flow record is not found, and the deletion process is finished.

It should be understood that, although the steps in the flowcharts involved in FIGS. 4-7 are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in FIGS. 4-7 may include multiple sub-steps or multiple stages that are not necessarily performed at the same time, but may be performed at different time. The execution order of these sub steps or stages is not necessarily sequential, but may be performed alternately or in turn with at least a part of other steps or the sub steps or stages of the other steps.

The practical effects of the embodiments of the present disclosure are described below in conjunction with test data.

It should be noted that in the actual operation of the data flow table, there are usually two types of exceptions.

A first type of exception is bucket overflow. The bucket overflow means that both candidate buckets are full when inserting a new data flow fingerprint into the fingerprint table, so that the data flow fingerprint cannot be inserted into the fingerprint table, and the corresponding data flow record cannot be inserted into the record table.

A second type of exception is data flow fingerprint conflict. The data flow fingerprint conflict means that during the lookup process, multiple data flow fingerprints are found in the two candidate buckets of the fingerprint table that are the same as the flow fingerprint being looked up.

For the first type of exception, the probability of the bucket overflow is analyzed first. If the quantity of the items needed to be accommodated in the data flow table is N and the quantity of the basic units in the record table (or fingerprint table) is M, M should be appropriately greater than N to ensure a low probability of the bucket overflow. The value of M may be determined according to a required bucket overflow probability. In papers "*How Asymmetry Helps Load Balancing [J]. Journal of the ACM on Computer*, 2003, 50 (4): 568-589. by B. Vocking" and "*The asymptotics* of selecting the shortest of two, improved [J]. In Analytic Methods in Applied Probability: In Memory of Fridrikh Karpelevich, edited by Y. Suhov, American Mathematical, by M Mitzenmacher, and B. Vocking", a method for calculating the probability of the bucket overflow of the d-left hash table by solving differential equations is provided, which is not repeated here.

The following Table 1 shows distribution probabilities of the number of records (x) in the bucket and the bucket overflow probabilities on a condition that the number d of the hash functions of the d-left hash table is equal to 2, the depth of the bucket is equal to 8, and an average number of the records (k) in the bucket is equal to 1-7 respectively. Since the depth of the bucket is 8, a relationship between the average number of the records (k) in the bucket, M and N is: k=8*N/M.

TABLE 1 distribution probabilities of the number of the records and bucket overflow probabilities

| x | k=1 | k=2 | k=3 | k=4 | k=5 | k=6 | k=7 |
|---|---|---|---|---|---|---|---|
| 0 | $2.28e^{-01}$ | $3.36e^{-02}$ | $4.60e^{-03}$ | $6.24e^{-04}$ | $8.45e^{-05}$ | $1.14e^{-05}$ | $1.55e^{-06}$ |
| 1 | $5.48e^{-01}$ | $2.07e^{-01}$ | $4.09e^{-02}$ | $6.89e^{-03}$ | $1.10e^{-03}$ | $1.72e^{-04}$ | $2.64e^{-05}$ |
| 2 | $2.19e^{-01}$ | $4.94e^{-01}$ | $1.98e^{-01}$ | $4.33e^{-02}$ | $8.05e^{-03}$ | $1.42e^{-03}$ | $2.42e^{-04}$ |
| 3 | $4.48e^{-03}$ | $2.56e^{-01}$ | $4.75e^{-01}$ | $1.93e^{-01}$ | $4.42e^{-02}$ | $8.66e^{-03}$ | $1.61e^{-03}$ |
| 4 | $5.14e^{-08}$ | $9.11e^{-03}$ | $2.70e^{-01}$ | $4.66e^{-01}$ | $1.91e^{-01}$ | $4.47e^{-02}$ | $9.00e^{-03}$ |
| 5 | $1.18e^{-21}$ | $4.97e^{-07}$ | $1.17e^{-02}$ | $2.77e^{-01}$ | $4.62e^{-01}$ | $1.89e^{-01}$ | $4.48e^{-02}$ |
| 6 | $4.09e^{-58}$ | $7.10e^{-19}$ | $1.09e^{-06}$ | $1.31e^{-02}$ | $2.80e^{-01}$ | $4.59e^{-01}$ | $1.88e^{-01}$ |
| 7 | 0 | $1.29e^{-50}$ | $6.50e^{-18}$ | $1.56e^{-06}$ | $1.39e^{-02}$ | $2.82e^{-01}$ | $4.58e^{-01}$ |
| 8 | 0 | 0 | $5.06e^{-48}$ | $1.77e^{-17}$ | $1.87e^{-06}$ | $1.43e^{-02}$ | $2.84e^{-01}$ |
| probability of bucket overflow | 0 | 0 | 0 | $7.47e^{-47}$ | $2.94e^{-17}$ | $3.17e^{-06}$ | $1.46e^{-02}$ |

As shown in Table 1, the bucket overflow probability is $3.17e^{-6}$ on a condition that the bucket depth is 8 and the average number of the records in the bucket is 6. The overflow probability is small enough so that the number of the records in the overflow table may be negligible compared to N. In addition, the data flow table may realize a space utilization of 6/8=75%. On a condition that the data flow table needs to hold 100 million items, i.e., $N=10^8$, and the bucket depth is 8 and the average number of the records in the bucket is 6, the required size of the memory is:

$(N*8/6)*(4+32)=4.8*10^9$ Bytes.

In other words, the required size of the memory is about 4.8 GB. In this condition, an expected value of the number of the records in the overflow table is:

$3.17e^{-6}*N/6=52.8$.

It can be seen that the number of the records in the overflow table may be negligible compared to the size of the memory. Therefore, an effect of the overflow table may be basically ignored when calculating the total memory consumption.

For the second type of exception, the probability of the data flow fingerprint conflict is first analyzed. The length of each data flow fingerprint is 32 bits, and the data flow fingerprint with all 32 bits being zero indicates that the basic unit is idle. Therefore, the probability of the data flow fingerprint conflict during searching the two buckets of the fingerprint table is:

$$1-\left(1-\frac{1}{2^{32}-1}\right)^{16} = 3.73*10^{-9}.$$

It can be seen that the probability of the fingerprint conflict is extremely low. Therefore, in the embodiment, an effect of the fingerprint conflict may be basically ignored in actual use.

For the IPv6 data flow table shown in FIG. 3, the probability of the bucket overflow exception is $2.39e^{-06}$ on a condition that the depth of the bucket is 16 and the average number of the records in the bucket is 14. The space utilization of the data flow table is 14/16=87.5%, which is higher than the space utilization of 75% of the IPv4 data flow table. The probability of the data flow fingerprint conflict of the IPv6 data flow table is twice that of the IPv4 data flow table, i.e., $7.46*10^{-9}$ since the depth of the bucket of the IPv6 data flow table is twice that of the IPv4 data flow table. However, such probability is still low enough to be ignored.

An embodiment of the present disclosure further provides a processing device for a data flow table for high-speed large-scale concurrent data flows. The processing device includes a data flow insertion module and a processing module.

The data flow insertion module is configured to acquire addresses of candidate buckets of a fingerprint table and a data flow fingerprint corresponding to a data flow identifier according to the data flow identifier of a data flow to be inserted. Basic units in the fingerprint table are in correspondence with basic units in a record table, and the addresses of the candidate buckets in the fingerprint table are the same as the addresses of the candidate buckets in the record table.

The processing module is configured to detect whether there is an idle unit in the candidate buckets of the fingerprint table, and select the candidate bucket having the idle unit as a target bucket if the idle unit is detected in one of the buckets. The idle unit is searched for sequentially from the bottom unit to the top unit of the target bucket. If the idle unit in the target bucket is found, the processing module writes the data flow fingerprint of the data flow to be inserted into the found idle unit, and writes a data flow record of the data flow to be inserted into a record bucket corresponding to the target bucket.

The processing module is further configured to insert the data flow record of the data flow to be inserted into an overflow table if there is no idle unit in any of the two candidate buckets, and terminate the insertion process.

In detail, the data flow table includes the fingerprint table, the record table and the overflow table. In each data flow table, the fingerprint table and the record table are both designed based on the d-left hash table, and the fingerprint table and the record table each include two blocks, each block of the fingerprint table and the record table include at least two buckets. Each bucket is configured to store the basic units. The quantity of the basic units in each bucket is no more than the depth of the bucket in which the basic units are located, and the depth of the fingerprint table is equal to the depth of the record table.

The basic units in the buckets of the fingerprint table are the data flow fingerprints. The field of the data flow identifier of each data flow includes: the source IP address, the destination IP address, the protocol number, the source port number, and the destination port number. A step of acquiring the data flow fingerprint of the fingerprint table based on the data flow identifier of the data flow to be inserted further includes: inputting the data flow identifier into a cyclic redundancy check algorithm to output the data flow fingerprint.

In addition, the processing module may further include a lookup module. The lookup module is configured to lookup a corresponding data flow record in the data flow table according to the data flow identifier of a data flow to be looked up.

In detail, the lookup module determines the basic units in the buckets of the fingerprint table using the calculated addresses of the buckets, and searches the data flow identifier matching the calculated data flow fingerprint from the determined basic units. If the data flow identifier matching the calculated data flow fingerprint is not found in the candidate buckets of the fingerprint table, the data flow identifier matching the calculated data flow fingerprint is further searched in the overflow table.

Furthermore, the processing module may further include an update module. The update module is configured to search a corresponding data flow record in the data flow table according to the data flow identifier of a data flow used for update, and updates the State field and the Meter field of the data flow record.

In detail, the corresponding data flow record is searched according to the data flow identifier Flow_ID. The fields in the data flow record are updated if the corresponding data flow record is found, the update is returned as successful and the update process is finished. For example, if the corresponding data flow record is found, the State field and the Meter field of the data flow record in the target unit $RB_i[k]$ are updated. The update is returned as failed if the corresponding data flow record is not found, and the update process is finished.

Furthermore, the processing module may further include a deletion module. The deletion module is configured to search a corresponding data flow record in the data flow table according to the data flow identifier of a data flow to be deleted, and resets the corresponding data flow record to zero.

In detail, the corresponding data flow record is searched according to the data flow identifier Flow_ID. If the corresponding data flow record is found, the found data flow record is reset to zero, the deletion is returned as successful, and the deletion process is finished. The deletion is returned as failed if the corresponding data flow record is not found, and the deletion process is finished.

The specific features of the processing device may be referred to the above descriptions of the processing method and are not repeated here. The modules of the above processing device may be implemented in whole or in part by software, hardware, and combination thereof. Each of the above modules may be embedded in or independent of a processor in a computer device in a form of hardware, or may be stored in a memory of the computer device in a form of software, so that the processor may be called to perform the operations corresponding to the above modules.

Figure 8:
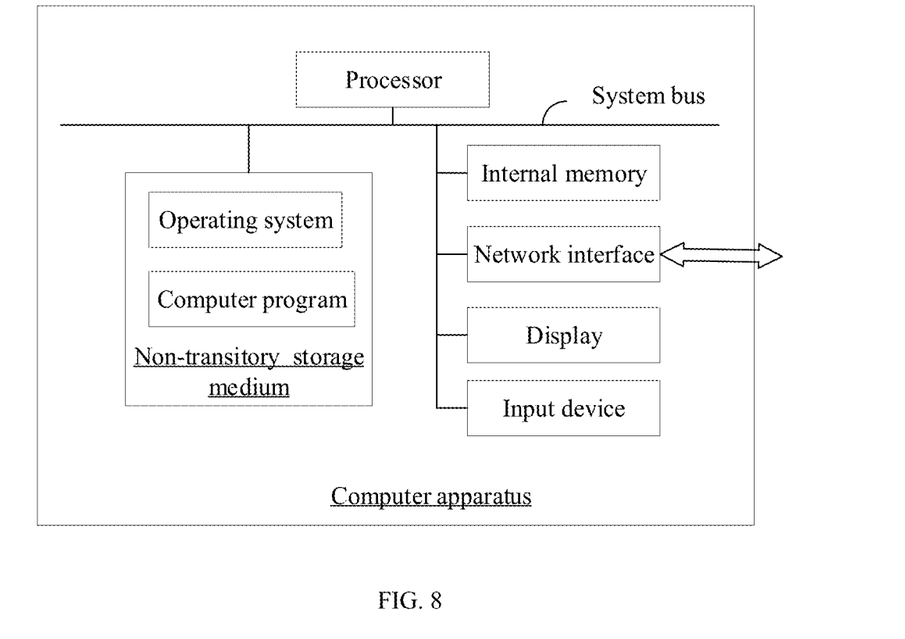
FIG. 8 is a diagram of an inner structure of a computer device according to an embodiment of the present disclosure.

In an embodiment, a computer apparatus is provided. The computer apparatus may be a server, an internal structure of which is shown in FIG. 8. The computer apparatus includes a processor, a memory, and a network interface, which are connected via a system bus. The processor of the computer apparatus is configured to provide computing and control capabilities. The memory of the computer apparatus may include a non-transitory storage medium and an internal memory. The non-transitory storage medium stores an operating system, a computer program, and a database. The internal memory provides an environment for the operation of the operating system and the computer program in the non-transitory storage medium. The database of the computer apparatus is configured to store the data flow tables. The network interface of the computer apparatus is configured to communicate with external terminals via a network connection. The computer program is executed by the processor to implement the method for processing the data flow table of the above embodiments.

Those skilled in the art should understand that the structure shown in FIG. 8 is only a block diagram of a part of the structure related to the solution of the present disclosure, and does not constitute a limitation on the computer apparatus to which the solution of the present disclosure is applied. A particular computer apparatus may include more or fewer components than those shown in FIG. 8, or combine certain components, or have a different arrangement of components.

The steps of the method or algorithm described in the present disclosure may be implemented by hardware or by software instructions executed by a processor. The software instructions may consist of corresponding software modules, which may be stored in a Random Access Memory (RAM), Flash memory, a Read Only Memory (ROM), an Erasable Programmable ROM (EPROM), an Electrically EPROM (EEPROM), a register, a hard disk, a removable hard disk, a Compact Disc Read-Only Memory (CD-ROM), or any other form of storage medium known in the art. An exemplary storage medium is coupled to the processor such that the processor may read information from the storage medium and write information to the storage medium. Of course, the storage medium may also be a part of the processor. The processor and the storage medium may be located in an Application Specific Integrated Circuit (ASIC). Besides, the ASIC may be located in a core network interface device. The processor and the storage medium may also be located in the core network interface device as discrete components.

Those skilled in the art should understand that in one or more of the above embodiments, the functions described in the present disclosure may be implemented by hardware, software, firmware, or any combination thereof. When implemented by the software, the functions may be stored in a computer readable medium or transmitted as one or more instructions or codes in the computer readable medium. Computer readable medium may include computer storage medium and communication medium, the communication media may include any medium that facilitates the transmission of the computer programs from one place to another. The storage medium may be any available medium that may be accessed by general computers or special purpose computers.

The above embodiments provide a detailed description of the purpose, technical solutions and beneficial effects of the present disclosure. It should be understood that the above description is only specific implementations of the present disclosure and is not intended to limit the protection scope of the present disclosure. Any modification, equivalent replacement, improvement, etc., made on the basis of the technical solution of the present disclosure should be included in the protection scope of the present disclosure.

What is claimed is:

1. A data flow table, comprising:
a fingerprint table configured to store a data flow fingerprint of a data flow to be inserted, wherein the fingerprint table adopts a d-left hash table, and is divided into two blocks, each block comprises at least two buckets, and the buckets are configured to store basic units;
a record table configured to store a data flow record of the data flow to be inserted, wherein the record table adopts the d-left hash table, and is divided into two blocks, each block comprises at least two buckets, the buckets are configured to store basic units, wherein the basic units in the record table and the basic units in the fingerprint table are in in one-to-one correspondence; and
an overflow table configured to store the data flow to be inserted if the data flow record of the data flow to be inserted is not able to be inserted into the record table.

2. The data flow table according to claim 1, wherein a quantity of the basic units in each bucket is less than or equal to a depth of the bucket in which the basic units are located.

3. The data flow table according to claim 1, wherein a depth of the buckets of the fingerprint table is equal to a depth of the buckets of the record table.

4. The data flow table according to claim 1, wherein the basic units in the buckets of the fingerprint table are configured to store data flow fingerprints, and the basic units in the buckets of the record table are configured to store data flow records.

5. The data flow table according to claim 4, wherein each data flow record is a four-tuple, which comprises a data flow identifier, a data flow state, a flow counter of the data flow, and metadata which is configured to represent a format.

6. The data flow table according to claim 5, wherein the data flow identifier is a five-tuple, which comprises a source IP address, a destination IP address, a protocol number, a source port number and a destination port number.

7. The data flow table according to claim 5, wherein the data flow identifier is configured to be input to a hash function to output the data flow fingerprint.

8. The data flow table according to claim 1, wherein the overflow table is a single function hash table.

9. The data flow table according to claim 1, wherein a basic unit with a highest access frequency in each bucket of the record table is located at a bottom of the bucket.

10. A method for processing a data flow table, wherein the data flow table comprises:
a fingerprint table configured to store a data flow fingerprint of a data flow to be inserted, wherein the fingerprint table adopts a d-left hash table, and is divided into two blocks, each block comprises at least two buckets, and the buckets are configured to store basic units;
a record table configured to store a data flow record of the data flow to be inserted, wherein the record table adopts the d-left hash table, and is divided into two blocks, each block comprises at least two buckets, the buckets are configured to store basic units, wherein the basic units in the record table and the basic units in the fingerprint table are in in one-to-one correspondence; and
an overflow table configured to store the data flow to be inserted if the data flow record of the data flow to be inserted is not able to be inserted into the record table;
wherein the method comprises:
acquiring, according to a data flow identifier of the data flow to be inserted, addresses of candidate buckets in each block of the fingerprint table of the data flow table and a data flow fingerprint corresponding to the data flow identifier, wherein the addresses of the candidate buckets in the fingerprint table are the same as addresses of candidate buckets in the record table;
detecting whether there is an idle unit in the candidate buckets of the fingerprint table, and selecting the candidate bucket having the idle unit as a target bucket if there is an idle unit; and
searching for the idle unit sequentially from a bottom unit to a top unit of the target bucket, and if the idle unit is found in the target bucket, writing the data flow fingerprint of the data flow to be inserted into the found idle unit, and writing the data flow record of the data flow to be inserted into a record bucket of the record table corresponding to the target bucket.

11. The method according to claim 10, wherein the detecting whether there is an idle unit in the candidate buckets of the fingerprint table comprises:
inserting the data flow record of the data flow to be inserted into the overflow table if the idle unit is not found in the candidate buckets, and terminating an insertion process.

12. The method according to claim 10, wherein the detecting whether there is an idle unit in the candidate buckets of the fingerprint table comprises:
selecting the candidate bucket with more idle units as the target bucket if the idle unit is found in each of the candidate buckets and quantities of the idle units in the candidate buckets are different; and/or
selecting the candidate bucket in a first block as the target bucket if the idle unit is found in each of the candidate buckets and quantities of the idle units in the candidate buckets are the same.

13. The method according to claim 10, wherein the acquiring the data flow fingerprint corresponding to the data flow identifier according to the data flow identifier of the data flow to be inserted comprises:
inputting the data flow identifier into a cyclic redundancy check algorithm to output the data flow fingerprint.

14. The method according to claim 10, wherein before the acquiring, according to a data flow identifier of the data flow to be inserted, addresses of candidate buckets in each block of the fingerprint table of the data flow table and a data flow fingerprint corresponding to the data flow identifier, the method further comprises:
performing cache alignment to the data flow table.

15. The method according to claim 10, further comprising:
placing the basic unit, which has a highest access frequency in each bucket of the record table, at a bottom of the bucket.

16. The method according to claim 10, further comprising:

calculating addresses of candidate buckets and a data flow fingerprint which correspond to a data flow to be looked up, according to a data flow identifier of the data flow to be looked up; and searching for a data flow record corresponding to the data flow identifier of the data flow to be looked up in the data flow table.

17. The method according to claim 10, further comprising:

searching, according to a data flow identifier of a data flow used for update, a corresponding data flow record in the data flow table; and in response to finding the corresponding data flow record, updating fields of the found data flow record to be the same as corresponding fields of the data flow used for update.

18. The method according to claim 10, further comprising:

searching a corresponding data flow record in the data flow table according to a data flow identifier of a data flow to be deleted; and in response to finding the corresponding data flow record, resetting the found corresponding data flow record to zero.

19. A device for processing a data flow table, wherein the data flow table comprises:

a fingerprint table configured to store a data flow fingerprint of a data flow to be inserted, wherein the fingerprint table adopts a d-left hash table, and is divided into two blocks, each block comprises at least two buckets, and the buckets are configured to store basic units;

a record table configured to store a data flow record of the data flow to be inserted, wherein the record table adopts the d-left hash table, and is divided into two blocks, each block comprises at least two buckets, the buckets are configured to store basic units, wherein the basic units in the record table and the basic units in the fingerprint table are in in one-to-one correspondence; and an overflow table configured to store the data flow to be inserted if the data flow record of the data flow to be inserted is not able to be inserted into the record table;

wherein the device comprises:

a data flow insertion module configured to acquire, according to a data flow identifier of the data flow to be inserted, addresses of candidate buckets in each block of the fingerprint table of the data flow table and a data flow fingerprint corresponding to the data flow identifier, wherein the addresses of the candidate buckets in the fingerprint table are the same as addresses of candidate buckets in the record table; and a processing module, configured to: detect whether there is an idle unit in the candidate buckets of the fingerprint table, and select the candidate bucket having the idle unit as a target bucket if there is an idle unit; and search for the idle unit sequentially from a bottom unit to a top unit of the target bucket, and if the idle unit is found in the target bucket, write the data flow fingerprint of the data flow to be inserted into the found idle unit, and write the data flow record of the data flow to be inserted into a record bucket of the record table corresponding to the target bucket.

20. A non-transitory computer-readable storage medium, on which a computer program is stored, wherein when the computer program is executed by a processor, steps of the method according to claim 10 are executed.

* * * * *